US012602437B2

(12) United States Patent
Okamoto

(10) Patent No.: US 12,602,437 B2
(45) Date of Patent: Apr. 14, 2026

(54) INFORMATION PROCESSING METHOD, INFORMATION PROCESSING APPARATUS, AND NON-TRANSITORY COMPUTER-READABLE STORAGE MEDIUM

(71) Applicant: Actapio, Inc., East Wenatchee, WA (US)

(72) Inventor: Shinichiro Okamoto, Wenatchee, WA (US)

(73) Assignee: Actapio, Inc., East Wenatchee, WA (US)

( * ) Notice: Subject to any disclaimer, the term of this patent is extended or adjusted under 35 U.S.C. 154(b) by 0 days.

(21) Appl. No.: 18/586,969

(22) Filed: Feb. 26, 2024

(65) Prior Publication Data

US 2025/0131047 A1      Apr. 24, 2025

Related U.S. Application Data

(60) Provisional application No. 63/592,302, filed on Oct. 23, 2023.

(51) Int. Cl.
*G06F 16/951* (2019.01)
*G06F 16/3332* (2025.01)

(52) U.S. Cl.
CPC ........ *G06F 16/951* (2019.01); *G06F 16/3334* (2019.01)

(58) Field of Classification Search
None
See application file for complete search history.

(56) References Cited

U.S. PATENT DOCUMENTS

2018/0349942 A1\*  12/2018  Mu .................. G06V 30/19173
2020/0293898 A1\*   9/2020  Okamoto .............. G06N 20/20
(Continued)

FOREIGN PATENT DOCUMENTS

JP      2021-168042 A    10/2021

OTHER PUBLICATIONS

Iwase, Yasuhiko, "Implementation and Results of improper content detection", dated Jan. 30, 2019, URL: https://mixi-developers.mixi. co.jp/mixi-20190110-d1cde81cf37c, in 16 pages.
(Continued)

*Primary Examiner* — Dawaune A Conyers
(74) *Attorney, Agent, or Firm* — PROCOPIO, CORY, HARGREAVES & SAVITCH LLP

(57) ABSTRACT

An information processing method includes: an obtaining process of inputting each of plural sets of input data to be subjected to inference processing to a model and obtaining plural output value output by the model and representing inference results respectively corresponding to the plural set of input data, and reference information indicating a reference for evaluation of the model; and a processing process of selecting an evaluated data group to be used in the evaluation of the model, from the plural output values, by using a threshold determined on the basis of the reference indicated by the reference information obtained by the obtaining process and calculating an index value representing an evaluation value of the model by using the evaluated data group selected.

13 Claims, 8 Drawing Sheets

(56) References Cited

U.S. PATENT DOCUMENTS

| | | | |
|---|---|---|---|
| 2022/0004918 A1* | 1/2022 | Hombaiah | G06F 16/9038 |
| 2023/0101817 A1* | 3/2023 | Sinha | G06F 16/93 |
| | | | 707/722 |

OTHER PUBLICATIONS

Iwase, Yasuhiko, "Story of 80% Reduction of Manpower Work with Small Cost", dated May 28, 2020, URL: https://qiita.com/yaiwase/items/44e4bcf2e28b01333a54, in 14 pages.
Hayakawa, Kazuki, "Story from First Planning of Machine Learning System in Company to Operation", dated Dec. 12, 2019, URL:https://qiita.com/kazuki_hayakawa/items/9ef67112cf6302f3e4ed, in 9 pages.
Japanese Patent Office, Office Action, Application No. 2024-016331, dated May 21, 2024, in 7 pages.

* cited by examiner

122

| MODEL ID | USE | MODEL DATA | ... |
|----------|-----|------------|-----|
| M1 | VIOLATION DETERMINATION | MDT1 | ... |
| ... | ... | ... | ... |

FIG.5

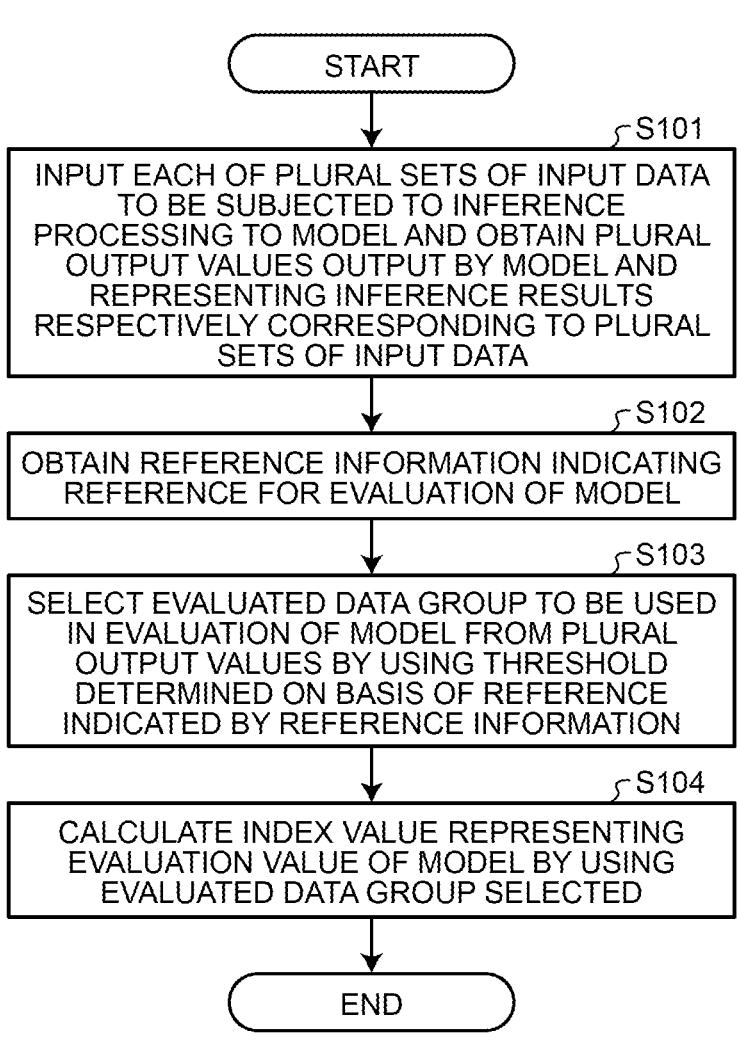

START

S101

INPUT EACH OF PLURAL SETS OF INPUT DATA
TO BE SUBJECTED TO INFERENCE
PROCESSING TO MODEL AND OBTAIN PLURAL
OUTPUT VALUES OUTPUT BY MODEL AND
REPRESENTING INFERENCE RESULTS
RESPECTIVELY CORRESPONDING TO PLURAL
SETS OF INPUT DATA

S102

OBTAIN REFERENCE INFORMATION INDICATING
REFERENCE FOR EVALUATION OF MODEL

S103

SELECT EVALUATED DATA GROUP TO BE USED
IN EVALUATION OF MODEL FROM PLURAL
OUTPUT VALUES BY USING THRESHOLD
DETERMINED ON BASIS OF REFERENCE
INDICATED BY REFERENCE INFORMATION

S104

CALCULATE INDEX VALUE REPRESENTING
EVALUATION VALUE OF MODEL BY USING
EVALUATED DATA GROUP SELECTED

END

INFORMATION PROCESSING METHOD, INFORMATION PROCESSING APPARATUS, AND NON-TRANSITORY COMPUTER-READABLE STORAGE MEDIUM

TECHNICAL FIELD

The present invention relates to an information processing method, an information processing apparatus, and a non-transitory computer-readable storage medium having stored therein an information processing program.

BACKGROUND ART

In recent years, a technique for generating models by causing various models, such as neural networks like deep neural networks (DNNs), to learn characteristics that training data have has been proposed. Furthermore, the trained models are used in various kinds of inference processing, such as various kinds of prediction and classification.

CITATION LIST

Patent Literature

Patent Literature 1: Japanese Laid-open Patent Publication No. 2021-168042

DISCLOSURE OF INVENTION

Problem to be Solved by the Invention

However, it is difficult to say that evaluation of the trained models are sufficiently assessed in the above mentioned technique. For example, relearning is performed without evaluation of the trained models in the above mentioned technique, and for some uses where these models are used, the relearning may result in precision lower than that of the original models. Therefore, in training a model, flexible evaluation in accordance with the use of the model is desired to be performed. The above mentioned technique thus has room for improvement in terms of evaluation of models that have been trained.

The present application has been made in view of the above and an object thereof is to provide an information processing method, an information processing apparatus, and a non-transitory computer-readable storage medium having stored therein an information processing program that enables flexible evaluation of a model.

Means for Solving Problem

An information processing method according to the present application is an information processing method executed by a computer, the information processing method comprising: an obtaining process of inputting each of plural sets of input data to be subjected to inference processing to a model, and obtaining: plural output values output by the model and representing inference results respectively corresponding to the plural sets of input data; and reference information indicating a reference for evaluation of the model; and a processing process of selecting an evaluated data group to be used in the evaluation of the model, from the plural output values, by using a threshold determined on the basis of the reference indicated by the reference information obtained by the obtaining process, and calculating an index value representing an evaluation value of the model by using the evaluated data group selected.

Effect of the Invention

According to an aspect of an embodiment, an effect of enabling flexible evaluation of a model is achieved.

BRIEF DESCRIPTION OF DRAWINGS

FIG. 5 is a flowchart illustrating an example of the information processing according to the embodiment.

BEST MODE OF CARRYING OUT THE INVENTION

A mode (hereinafter, referred to as an "embodiment") for implementing an information processing method, an information processing apparatus, and a non-transitory computer-readable storage medium having stored therein an information processing program according to the present application will hereinafter be described in detail while reference is made to the drawings. The information processing method, the information processing apparatus, and the information processing program according to the present application are not to be limited by the embodiment. Furthermore, in each embodiment below, the same signs will be assigned to the same parts and redundant description thereof will be omitted.

EMBODIMENT

1. Embodiment

Figure 1:
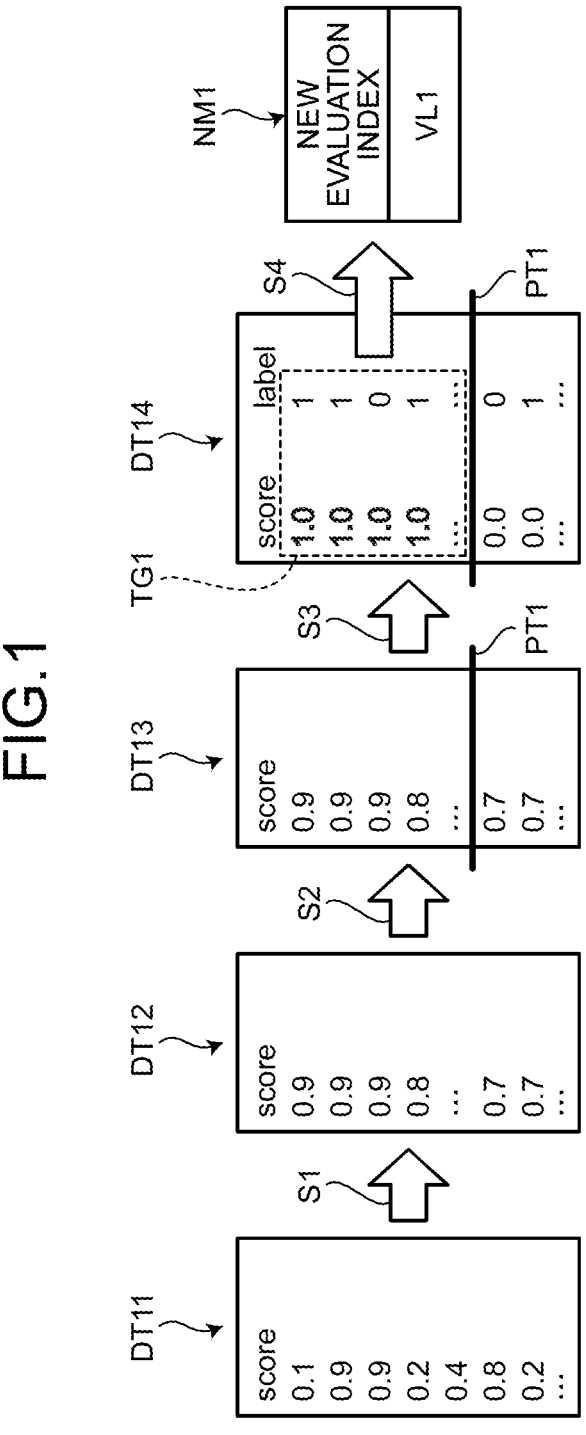
FIG. 1 is a diagram illustrating an example of information processing according to an embodiment.

An example of information processing according to an embodiment will be described by use of FIG. 1. FIG. 1 is a diagram illustrating the example of the information processing according to the embodiment. For example, an information processing apparatus 100 (see FIG. 3) executes the information processing illustrated in FIG. 1. A model (also referred to as a "violative post determination model") to be used in determining whether or not posts (pieces of textual information), such as questions and answers on the Internet, are violative will hereinafter be described as an example of a model to be evaluated. The violative post determination model is just an example of a model to be evaluated in the information processing described hereinafter, and without being limited to a violative post determination model, any model, to which the information processing described hereinafter is applicable, is adoptable as a model to be evaluated.

1-1. Example of Information Processing

An example of information processing executed by the information processing apparatus 100 will hereinafter be described by use of FIG. 1. Firstly, before description of the processing below, premises thereof will be described briefly. For example, in the example illustrated in FIG. 1, the violative post determination model to be evaluated is a model that outputs, in a case where a piece of textual information, such as a post, has been input to the model, an output value (also referred to as a "score") indicating possibility (a degree) of that piece of textual information being violative. For example, the violative post determination model is a model that outputs a score (value) from 0 to 1, and the higher the possibility of the input piece of textual information being violative in the case where the piece of textual information has been input to the model, the higher the score (value) output by the model. A post being violative may herein mean, for example, that the post violates guidelines for the service (such as an Internet posting service) through which the post was posted.

Firstly, in FIG. 1, the information processing apparatus 100 obtains a data group DT11 including plural output values (scores) output by the violative post determination model, to which each of plural pieces of textual information to be subjected to violation determination (inference processing) has been input, the plural output values (scores) corresponding respectively to the plural pieces of textual information. For example, the information processing apparatus 100 may input each of the plural pieces of textual information to be subjected to the violation determination to the violative post determination model and generate the data group DT11 including the plural output values (scores) output by the violative post determination model, the output values (scores) indicating inference results respectively corresponding to the plural pieces of textual information.

The information processing apparatus 100 may obtain (receive) the data group DT11 including the plural output values (scores) output by the violative post determination model, the plural output values (scores) indicating the inference results respectively corresponding to the plural pieces of textual information, from another computer (external apparatus), such as an information providing apparatus 50. Any pieces of textual information are adoptable as the plural pieces of textual information input to the violative post determination model and the plural pieces of textual information input to the violative post determination model may include a piece of textual information posted in the past or may include a piece of textual information generated (prepared) for evaluation calculation. That is, the pieces of textual information (sets of input data) input to the violative post determination model are not limited to information that has been actually posted, and any information is adoptable.

In FIG. 1, the information processing apparatus 100 calculates an evaluation value of the violative post determination model by using the plural output values (scores) as illustrated by the data group DT11. Each of the output values (scores) included in the data group DT11 in FIG. 1 has a label (a piece of correct answer information) assigned thereto, similarly to that in a data group DT14 described later, the label indicating whether or not the piece of textual information corresponding to that output value is violative, but illustration of the label is omitted.

Firstly, the information processing apparatus 100 sorts the plural output values included in the data group DT11 in descending order of value (Step S1). In FIG. 1, the information processing apparatus 100 generates a data group DT12 having the plural output values arranged in descending order of value, by arranging (sorting) the plural output values included in the data group DT11 in descending order of value.

The information processing apparatus 100 then determines a threshold on the basis of a reference for evaluation of the model (Step S2). The information processing apparatus 100 determines a threshold PT1 on the basis of the reference indicating the number of pieces of textual information that are able to be checked in a case where plural pieces of textual information are checked by predetermined staff, as illustrated by a data group DT13 in FIG. 1. For example, the information processing apparatus 100 obtains reference information indicating the number of pieces of textual information that are able to be checked in a case where whether or not plural pieces of textual information are violative is checked through visual inspection by the staff for dealing with violative posts, and determines the threshold PT1 on the basis of the reference information obtained.

For example, in a case where the number of pieces of textual information that are able to be checked upon checking of plural pieces of textual information by predetermined staff is the top X % (where X is any value, such as 5 or 10, for example) of the data group DT13 (data group DT12), the information processing apparatus 100 determines, as the threshold PT1, a value, to or than which the data (scores) of the top X % of the data group DT13 are equal or larger. For example, in a case where the number of pieces of textual information that are able to be checked upon checking of plural pieces of textual information by predetermined staff is the top 8% of the data group DT13, the information processing apparatus 100 determines, as the threshold PT1, a value (for example, 0.7), to or than which the data (scores) of the top 8% of the data group DT13 are equal or larger.

The number of pieces of textual information that are able to be checked, the number being indicated by reference information, may be a specific number, without being limited to a value indicating a checkable proportion of the data group, like the top several percent (for example, 5% or 10%). In this case, for example, if the number of pieces of textual information that are able to be checked is one thousand upon checking of plural pieces of textual information by predetermined staff, the information processing apparatus 100 may determine, as the threshold, a value, to or than which the data (scores) of the top one thousand pieces of textual information of the data group DT13 are equal or larger.

The information processing apparatus 100 then sets all output values that are equal to or larger than the threshold, among the plural output values that have been sorted, to a first value larger than the threshold, and sets all output values that are less than the threshold, among the plural output values that have been sorted, to a second value smaller than the threshold (Step S3). In FIG. 1, the information processing apparatus 100 sets, among the sets of data (scores) of the data group DT13, as illustrated by the data group DT14, all output values equal to or larger than the threshold PT1 to a first value larger than the threshold PT1, and sets all output values that are less than the threshold PT1 to a second value smaller than the threshold PT1.

For example, the information processing apparatus 100 sets, among the sets of data (scores) of the data group DT13, all output values equal to or larger than the threshold PT1 (for example, 0.7) to a first value, "1", larger than the threshold PT1, and sets all output values less than the threshold PT1 (for example, 0.7) to a second value, "0", smaller than the threshold PT1. That is, the information processing apparatus 100 sets the scores of the data group of the top X % of the data group DT13 to the first value, "1", and sets the scores of the data group not in the top X % to the second value, "0".

The information processing apparatus 100 thereby generates the data group DT14 having all output values equal to or larger than the threshold PT1 (for example, 0.7) that have been set to the first value, "1", larger than the threshold PT1, and all output values less than the threshold PT1 (for example, 0.7) that have been set to the second value, "0", smaller than the threshold PT1. The above mentioned first value and second value are just examples, the first value may be any value larger than the threshold without being limited to "1", and the second value may be any value smaller than the threshold without being limited to "0".

By using the evaluated data group that has been set to the first value, the information processing apparatus 100 then calculates an index value representing an evaluation value of the model (Step S4). In FIG. 1, the information processing apparatus 100 selects sets of data having their scores set to the first value, "1", as an evaluated data group TG1, from the data group DT14. By using the evaluated data group TG1 determined, the information processing apparatus 100 calculates the index value representing the evaluation value of the violative post determination model.

In FIG. 1, the information processing apparatus 100 calculates, as illustrated by new evaluation index information NM1, an index value VL1 representing the evaluation value of the violative post determination model. For example, by using information on the labels (pieces of correct answer information) respectively associated with the scores equal to or larger than the threshold PT1, that is, the scores of the evaluated data group TG1 that is the data group of the top X % of the data group DT14, the information processing apparatus 100 calculates the index value representing the evaluation value of the violative post determination model. For example, a piece of textual information corresponding to a score that has been associated with a label, "1", is a piece of textual information (post) that is violative, and a piece of textual information corresponding to a score that has been associated with a label, "0", is a piece of textual information (post) that is not violative.

For example, the information processing apparatus 100 calculates, as the index value VL1 representing the evaluation value of the violative post determination model, a value indicating a proportion of sets of data that are violative, the sets of data being included in the evaluated data group TG1. On the basis of the proportion of the sets of data associated with the label, "1", indicating that the sets of data are violative, in the evaluated data group TG1, the information processing apparatus 100 calculates the index value VL1 representing the evaluation value of the violative post determination model. For example, the information processing apparatus 100 calculates, as the index value VL1, a value resulting from division of the number of sets of data that have been associated with the label, "1", in the sets of data (scores) included in the evaluated data group TG1, by the total number of sets of data (scores) included in the evaluated data group TG1.

As described above, by using only the sets of data corresponding to the number of sets of data that are able to be checked upon checking by the predetermined staff, the sets of data being from the data group, the information processing apparatus 100 calculates the evaluation value of the model. The information processing apparatus 100 is thereby able to perform calculation of the evaluation value of the model, the calculation being targeted only for the sets of data corresponding to the number that the staff is able to handle. Therefore, the information processing apparatus 100 is able to calculate the evaluation value according to the state of use of the model without just simply using all of the sets of data for calculation of the evaluation value, and thus enables flexible evaluation of the model.

Any model, to which the above described information processing is applicable, is adoptable as a model to be evaluated, without being limited to a violative post determination model, and a model to be evaluated may be any of various models, such as, for example, a violative product determination model and a violative image determination model.

Furthermore, an information processing system 1 may use the evaluation value of the model calculated by the information processing apparatus 100 in various kinds of processing. The information processing system 1 may provide information indicating an evaluation value of a model, the evaluation value having been calculated by the information processing apparatus 100, to a service provider (such as a user) who provides a service using that model. In this case, the information processing system 1 transmits the information indicating the evaluation value of the model calculated by the information processing apparatus 100 to a computer (such as a terminal apparatus 10) used by the service provider who provides the service using that model. Furthermore, for example, by using the evaluation value of the model calculated by the information processing apparatus 100, the information processing system 1 may perform processing related to optimization of the model. For example, by using the evaluation value of the model calculated by the information processing apparatus 100, the information processing system 1 may repeat update processing of updating the model (parameters of the model, for example).

For example, the information processing system 1 may perform calculation of an evaluation value of each of plural models to be evaluated, select a model having a high evaluation value from the plural models, perform update processing of updating the model selected, and thereby improve the precision of the model. For example, the information processing system 1 may select a model having the highest calculated evaluation value from the plural models, and train the plural models by performing update processing of updating the model selected. The information processing system 1 may then select a model having the highest calculated evaluation value from the plural models that have been trained and perform update processing for the model selected.

As described above, the information processing system 1 may repeatedly perform update (improvement) of a model by using evaluation values of models calculated by the information processing apparatus 100. For example, update processing of updating a model may be performed by any apparatus in the information processing system 1. The above described processing is just an example, and as long as the information processing system 1 uses an evaluation value of a model, the evaluation value having been calculated by the information processing apparatus 100, the information processing system 1 may perform processing related to optimization of the model in any way.

For example, the information processing apparatus 100 may perform update processing of updating a model. Furthermore, for example, the information providing apparatus 50 may perform update processing of updating a model. In this case, the information processing apparatus 100 may transmit information indicating a calculated evaluation value of the model to the information providing apparatus 50 and the information providing apparatus 50 may perform, on the basis of the evaluation value of the model received from the information processing apparatus 100, the update processing of updating the model. The information processing apparatus 100 may then receive information related to the model that has been subjected to the update processing, from the information providing apparatus 50, and calculate an evaluation value of the model by using the information received. For example, the information processing apparatus 100 may receive information on, for example, a model that has been subjected to update processing and a data group generated by use of that model, from the information providing apparatus 50, and calculate an evaluation value of the model by using the information received.

As described above, the information processing apparatus 100 may use information on calculated evaluation values (for example, index values) of models in various types of information processing and quality improvement of services, for example. A specific example thereof will be described below. An example of a case where quality of an Internet posting service (also simply referred to as a "posting service") is improved by use of information on a calculated evaluation value of a model will be described hereinafter. Processing, to which information on a calculated evaluation value of a model is applied, is not limited to the following processing, and may be used in, for example, various types of information processing and quality improvement of services.

For example, calculating an index value representing an evaluation value of a model by using only data corresponding to the number of sets of data that are able to be checked in a case where a data group from a posting service is checked by staff who checks for any violative posts in the posting service results in obtainment of an optimum model for the posting service. That is, calculating index values of models through the above described processing enables optimization of a model, such as selection of a model, by use, as is, of proportions of violative posts deleted, as evaluation indices of the models, the proportions serving as key performance indicators (KPIs) pursued by a posting service, for example.

In other words, the index value of a model being high, the index value having been calculated by the information processing apparatus 100, means that the proportion of violative posts deleted by the model is high and that the model is highly effective for the posting service. That is, for plural models, a model having the highest index value calculated by the information processing apparatus 100 among the plural models is the model having the highest proportion of violative posts deleted and is the model most desired by the posting service. Therefore, performing optimization of a model, such as selection of a model as described above, by use of index values of models calculated by the information processing apparatus 100 enables appropriate generation of the model that is most desired by a posting service.

Furthermore, the number of staff to check for any violative posts for a posting service may change. In a case where the number of staff to check for any violative posts for a posting service has thus changed, the threshold (for example, the value of X for the top X %) to be used in calculation of an evaluation value of a model in the above described processing is changed. That is, the selected model will change according to the threshold that is changed according to the number of staff to check for any violative posts for the posting service in the above described processing.

As described above, even in a case where the processing performed by the information processing apparatus 100 is targeted for the same data group, according to the number of staff to check for any violative posts for a posting service, the optimum model to be selected (for example, the model having the highest index value) is able to be changed. Therefore, even in a case where the number of staff to check for any violative posts for a posting service changes, the information processing apparatus 100 is able to appropriately select the optimum model according to the number of staff that has changed.

By contrast, as to conventional indices, unlike evaluation values (for example, index values) of models calculated by the information processing apparatus 100 through the above described processing, even if the conventional indices are combined, the model most desired by a service is difficult to be obtained. The number of records, for which their predictive values (for example, output values of a model) are "True" (for example, being violative posts), is able to be obtained from a threshold set between 0.0 to 1.0 if recall (recall ratios) is used for a data group, but calculating an appropriate threshold from an optional number of records on the contrary requires searching. Therefore, performing, using conventional indices, processing (such as optimization of a model) similar to that in a case where evaluation values of models calculated by the information processing apparatus 100 are used through the above described processing is difficult scheme-wise.

By contrast, by calculating evaluation values of models through the processing described above, the information processing apparatus 100 enables flexible evaluation of the models. Furthermore, by performing optimization of a model, such as selection of a model using calculated evaluation values of models, the information processing apparatus 100 is able to select, even in a case where the number of staff to check for any violative posts for a posting service changes, the optimum model according to the changed number of staff, and is able to appropriately generate a model most desired by the posting service.

1-2. Configuration of Information Processing System

Figure 2:
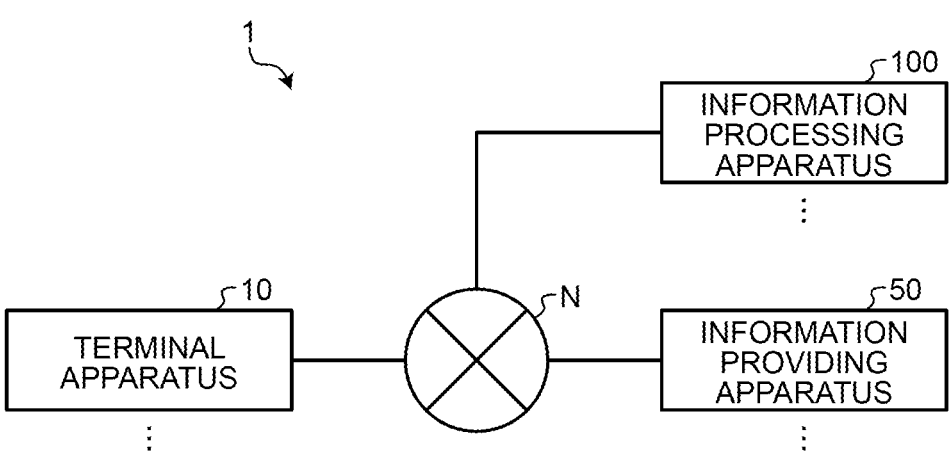
FIG. 2 is a diagram illustrating an example of a configuration of an information processing system according to the embodiment.

As illustrated in FIG. 2, the information processing system 1 includes the terminal apparatus 10, the information providing apparatus 50, and the information processing apparatus 100. The terminal apparatus 10, the information providing apparatus 50, and the information processing apparatus 100 are communicably connected to one another by wire or wirelessly via a predetermined network N. FIG. 2 is a diagram illustrating an example of a configuration of an information processing system according to a first embodiment. The information processing system 1 illustrated in FIG. 2 may include a plurality of the terminal apparatuses 10, a plurality of the information providing apparatuses 50, and/or a plurality of the information processing apparatuses 100.

The terminal apparatus 10 is an information processing apparatus used by a user. The terminal apparatus 10 receives various operations from a user. The terminal apparatus 10 may hereinafter be referred to as a user. That is, a user may hereinafter be read as the terminal apparatus 10. The terminal apparatus 10 mentioned above is implemented by, for example, a smartphone, a tablet device, a notebook personal computer (PC), a desktop PC, a mobile telephone, or a personal digital assistant (PDA).

The information providing apparatus 50 is an information processing apparatus where information is stored, the information being for provision of various types of information to the information processing apparatus 100, the various types of information being those to be used by the information processing apparatus 100 in processing. For example, the information providing apparatus 50 is a computer that generates a model that has been caused to learn characteristics that training data have, and is implemented by, for example, a server apparatus or a cloud system. For example, upon receipt of a configuration file as a generation index for a model, the configuration file indicating the kind and behavior of the model to be generated and how characteristics of training data are to be learned, the information providing apparatus 50 automatically generates the model according to the configuration file received. The information providing apparatus 50 may train the model by using any model training method. Furthermore, for example, the information providing apparatus 50 may be any of various existing services including automated machine learning (AutoML).

The information processing apparatus 100 is a computer that executes information processing. The information processing apparatus 100 executes calculation processing of calculating an index value representing an evaluation value of a model. Furthermore, for example, the information processing apparatus 100 is a computer that executes index generation processing of generating a generation index that is an index in generation of a model (that is, a recipe of the model) and model generation processing of generating the model according to the generation index, and may be implemented by, for example, a server apparatus or a cloud system.

1-3. Configuration of Information Processing Apparatus

Figure 3:
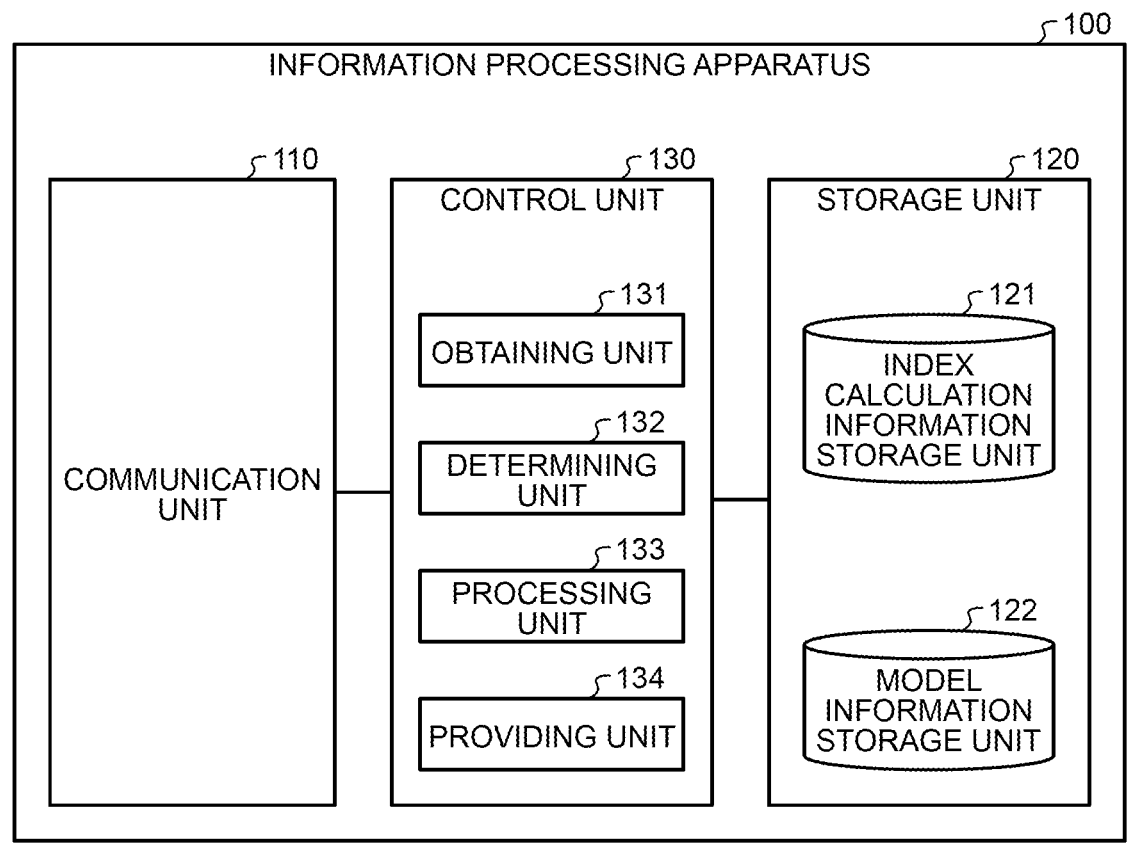
FIG. 3 is a diagram illustrating an example of a configuration of an information processing apparatus according to the embodiment.

A configuration of the information processing apparatus 100 according to the embodiment will be described next by use of FIG. 3. FIG. 3 is a diagram illustrating an example of the configuration of the information processing apparatus 100 according to the embodiment. As illustrated in FIG. 3, the information processing apparatus 100 has a communication unit 110, a storage unit 120, and a control unit 130. The information processing apparatus 100 may have an input unit (for example, a keyboard and a mouse) that receives various operations from, for example, an administrator of the information processing apparatus 100, and a display unit (for example, a liquid crystal display) for displaying various types of information.

Communication Unit 110

The communication unit 110 is implemented by, for example, a network interface card (NIC). The communication unit 110 is connected by wire or wirelessly to a network (for example, the network N in FIG. 2) and performs transmission and reception of information to and from the terminal apparatus 10 and the information providing apparatus 50.

Storage Unit 120

The storage unit 120 is implemented by, for example: a semiconductor memory element, such as a random access memory (RAM) or a flash memory; or a storage device, such as a hard disk or an optical disk. The storage unit 120 according to the embodiment has, as illustrated in FIG. 3, an index calculation information storage unit 121 and a model information storage unit 122.

Index Calculation Information Storage Unit 121

The index calculation information storage unit 121 according to the embodiment stores various types of information to be used in index calculation. For example, the index calculation information storage unit 121 stores a function to be used in the index calculation. For example, the index calculation information storage unit 121 stores reference information indicating a reference for evaluation of a model. For example, the index calculation information storage unit 121 stores a reference to be used in determination of a threshold.

Furthermore, the index calculation information storage unit 121 may store plural output values output by a model to be evaluated. The index calculation information storage unit 121 may store information having the output values output by the model to be evaluated, the output values having been respectively associated with labels (pieces of correct answer information) indicating whether or not sets of input data corresponding to the output values are violative.

Without being limited to the above description, the index calculation information storage unit 121 may store various types of information according to purposes.

Model Information Storage Unit 122

Figure 4:
FIG. 4 is a diagram illustrating an example of a model information storage unit according to the embodiment.

The model information storage unit 122 according to the embodiment stores information related to a (machine learning) model. For example, the model information storage unit 122 stores information (model data) on a trained model (model) that has been trained (generated) by training processing. FIG. 4 is a diagram illustrating an example of a model information storage unit according to the embodiment. In the example illustrated in FIG. 4, the model information storage unit 122 includes items, such as "model ID", "use", and "model data".

"Model ID" represents identification information for identification of models. "Use" indicates uses of the corresponding models. "Model data" represent sets of data on the models. FIG. 4 illustrates an example where conceptual information, such as "MDT1" is stored as "model data" but in practice, various types of information composing the model, such as information on the configuration (network configuration) of the model and information related to its parameters, are included. For example, "model data" include information including nodes in each layer of the network, a function adopted by each node, connective relations among the nodes, and connection coefficients set for connection among the nodes.

FIG. 4 illustrates that the use of the model (model M1) identified by the model ID, "M1", is "violation determination", and, for example, that the model M1 is a model to be used in determination (estimation) of whether or not a set of input data, such as a piece of input text (a piece of textual information), is violative. For example, the model M1 is a model that outputs, in a case where a piece of text (textual information) is input to the model M1, a score (value) as output data, the score indicating the degree of possibility of the content of that piece of text being violative. Furthermore, FIG. 4 illustrates that the set of model data on the model M1 is the set of model data MDT1.

Without being limited to the above description, the model information storage unit 122 may store various types of information according to purposes. A model, such as the model M1, may be used as a program module that is part of artificial intelligence software. A model, such as the model M1, may be a program.

Control Unit 130

As to description of FIG. 3 again, the control unit 130 is a controller, and is implemented by, for example, various programs (corresponding to an example of an information processing program) being executed, with a RAM serving as a work area, by a central processing unit (CPU), a micro processing unit (MPU), or a graphics processing unit (GPU), the various programs having been stored in a storage device inside the information processing apparatus 100. Furthermore, the control unit 130 is a controller and is implemented by an integrated circuit, such as an application specific integrated circuit (ASIC) or a field programmable gate array (FPGA).

As illustrated in FIG. 3, the control unit 130 has an obtaining unit 131, a determining unit 132, a processing unit 133, and a providing unit 134, and implements or executes functions and effects of information processing described hereinafter. The internal configuration of the control unit 130 is not limited to the configuration illustrated in FIG. 3, and may be any other configuration that performs the information processing described later.

Obtaining Unit 131

The obtaining unit 131 obtains various types of information. For example, the obtaining unit 131 obtains various types of information from the storage unit 120. For example, the obtaining unit 131 obtains various types of information from the index calculation information storage unit 121 and the model information storage unit 122. Furthermore, the obtaining unit 131 obtains various types of information from an external information processing apparatus. The obtaining unit 131 obtains various types of information from the terminal apparatus 10 and the information providing apparatus 50.

The obtaining unit 131 inputs each of plural sets of input data to be subjected to inference processing to a model and obtains: plural output values output by the model and representing inference results respectively corresponding to the plural sets of input data; and reference information indicating a reference for evaluation of the model. The obtaining unit 131 inputs each of plural sets of input data that are pieces of textual information to be subjected to determination of whether or not the pieces of textual information are violative, to a model, and obtains plural output values output by the model and representing determination results respectively corresponding to the plural sets of input data.

The obtaining unit 131 inputs each of plural sets of input data that are pieces of post information on the Internet, to a model, and obtains plural output values output by the model and representing determination results respectively corresponding to the plural sets of input data. The obtaining unit 131 obtains plural output values output by a model, and the higher the possibility of an input piece of textual information being violative, the higher the value output by this model. The obtaining unit 131 obtains reference information indicating the number of sets of input data that are able to be checked in a case where plural sets of input data are checked by predetermined staff.

Determining Unit 132

The determining unit 132 executes determination processing of determining various types of information. The determining unit 132 stores information that has been determined, into the storage unit 120. The determining unit 132 executes the determination processing on the basis of various types of information stored in the storage unit 120. For example, on the basis of various types of information received from an external information processing apparatus, the determining unit 132 executes the determination processing. For example, on the basis of various types of information obtained by the obtaining unit 131, the determining unit 132 executes the determination processing.

On the basis of a reference indicated by reference information, the determining unit 132 determines a threshold. By using reference information stored in the index calculation information storage unit 121, the determining unit 132 determines a threshold.

Processing Unit 133

The processing unit 133 executes generation processing of generating various types of information. The processing unit 133 stores information that has been generated, into the storage unit 120. For example, on the basis of various types of information obtained by the obtaining unit 131, the processing unit 133 executes the generation processing. On the basis of various types of information stored in the storage unit 120, the processing unit 133 executes the generation processing. For example, on the basis of various types of information received from an external information processing apparatus, the processing unit 133 executes the generation processing. On the basis of various types of information determined by the determining unit 132, the processing unit 133 executes the generation processing.

The processing unit 133 executes calculation processing of calculating various types of information. The processing unit 133 stores information that has been calculated, into the storage unit 120. For example, on the basis of various types of information obtained by the obtaining unit 131, the processing unit 133 executes the calculation processing. On the basis of various types of information stored in the storage unit 120, the processing unit 133 executes the calculation processing. For example, on the basis of various types of information received from an external information processing apparatus, the processing unit 133 executes the calculation processing. On the basis of various types of information determined by the determining unit 132, the processing unit 133 executes the calculation processing. By using a threshold determined by the determining unit 132, the processing unit 133 executes the calculation processing.

By using a threshold determined on the basis of a reference indicated by reference information obtained by the obtaining unit 131, the processing unit 133 selects an evaluated data group to be used in evaluation of a model, from plural output values, and calculates an index value representing an evaluation value of the model by using the evaluated data group selected.

The processing unit 133 selects, from the plural output values, as the evaluated data group, output values equal to or larger than the threshold, and calculates, as the index value representing the evaluation value of the model, a value indicating a proportion of sets of data that are violative, the sets of data being included in the evaluated data group.

The processing unit 133 selects an evaluated data group corresponding to a certain number of output values from plural output values by using a threshold, and calculates, as an index value representing an evaluation value of a model, a value indicating a proportion of sets of data that are violative, the sets of data being included in the evaluated data group corresponding to the certain number of output values. The processing unit 133 sorts the plural output values in descending order of value. The processing unit 133 sets all output values equal to or larger than the threshold to a first value larger than the threshold, among the plural output values that have been sorted. The processing unit 133 sets all output values less than the threshold to a second value smaller than the threshold, among the plural output values that have been sorted. By using the evaluated data group that has been set to the first value, the processing unit 133 calculates the index value representing the evaluation value of the model.

The processing unit 133 executes optimization processing for a model by using an index value. The processing unit 133 executes optimization processing for a model by using plural index values respectively calculated for plural models. The processing unit 133 executes the optimization processing for the model by selecting a model having the highest index value from the plural models. For example, by using the calculated evaluation values of the models, the processing unit 133 may execute processing related to optimization of the model. For example, by using the calculated evaluation values of the models, the processing unit 133 may repeat update processing of updating the model.

For example, the processing unit 133 executes optimization processing for a model by respectively calculating evaluation values of plural models to be evaluated, selecting a model with a high evaluation value from the plural models, and performing update processing of updating the selected model. For example, the processing unit 133 executes optimization processing for a model by selecting a model with the highest calculated evaluation value from plural models, generating plural models by performing update processing of updating the selected model, and selecting a model with the highest index value from the plural models generated. For example, the processing unit 133 executes optimization processing for a model by selecting a model with the highest calculated evaluation value from plural models that have been trained.

Providing Unit 134

The providing unit 134 executes provision processing of providing various types of information. On the basis of various types of information stored in the storage unit 120, the providing unit 134 executes the provision processing. For example, on the basis of various types of information received from an external information processing apparatus, the providing unit 134 executes the provision processing. For example, the providing unit 134 transmits various types of information to the terminal apparatus 10 and the information providing apparatus 50.

For example, on the basis of various types of information obtained by the obtaining unit 131, the providing unit 134 executes the provision processing. On the basis of various types of information determined by the determining unit 132, the providing unit 134 executes the provision processing. On the basis of various types of information generated by the processing unit 133, the providing unit 134 executes the provision processing. On the basis of various types of information calculated by the processing unit 133, the providing unit 134 executes the provision processing. For example, the providing unit 134 transmits information indicating an index calculated by the processing unit 133, to an external apparatus, such as the terminal apparatus 10. For example, the providing unit 134 transmits information indicating a result of processing by the processing unit 133, to the information providing apparatus 50.

1-4. Flow of Information Processing

Steps of information processing by the information processing system 1 according to the embodiment will be described next by use of FIG. 5. FIG. 5 is a flowchart illustrating an example of the information processing according to the embodiment.

As illustrated in FIG. 5, the information processing apparatus 100 inputs each of plural sets of input data to be subjected to inference processing, into a model and obtains plural output values output by the model and representing inference results respectively corresponding to the plural sets of input data (Step S101). The information processing apparatus 100 obtains reference information indicating a reference for evaluation of the model (Step S102).

By using a threshold determined on the basis of the reference indicated by the reference information, the information processing apparatus 100 selects an evaluated data group to be used in the evaluation of the model, from the plural output values (Step S103). By using the evaluated data group selected, the information processing apparatus 100 calculates an index value representing an evaluation value of the model (Step S104).

1-5. Examples of Experimental Results

Figure 6:
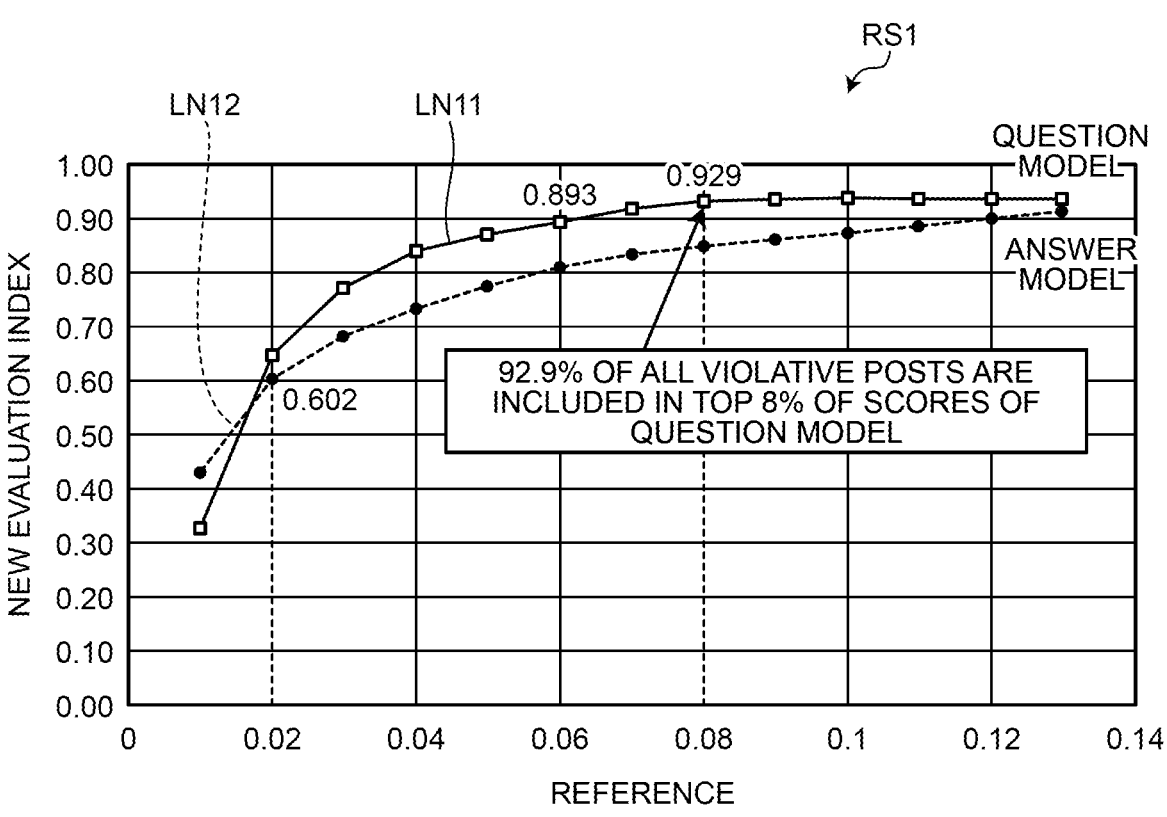
FIG. 6 is a diagram illustrating an example of experimental results.
Figure 7:
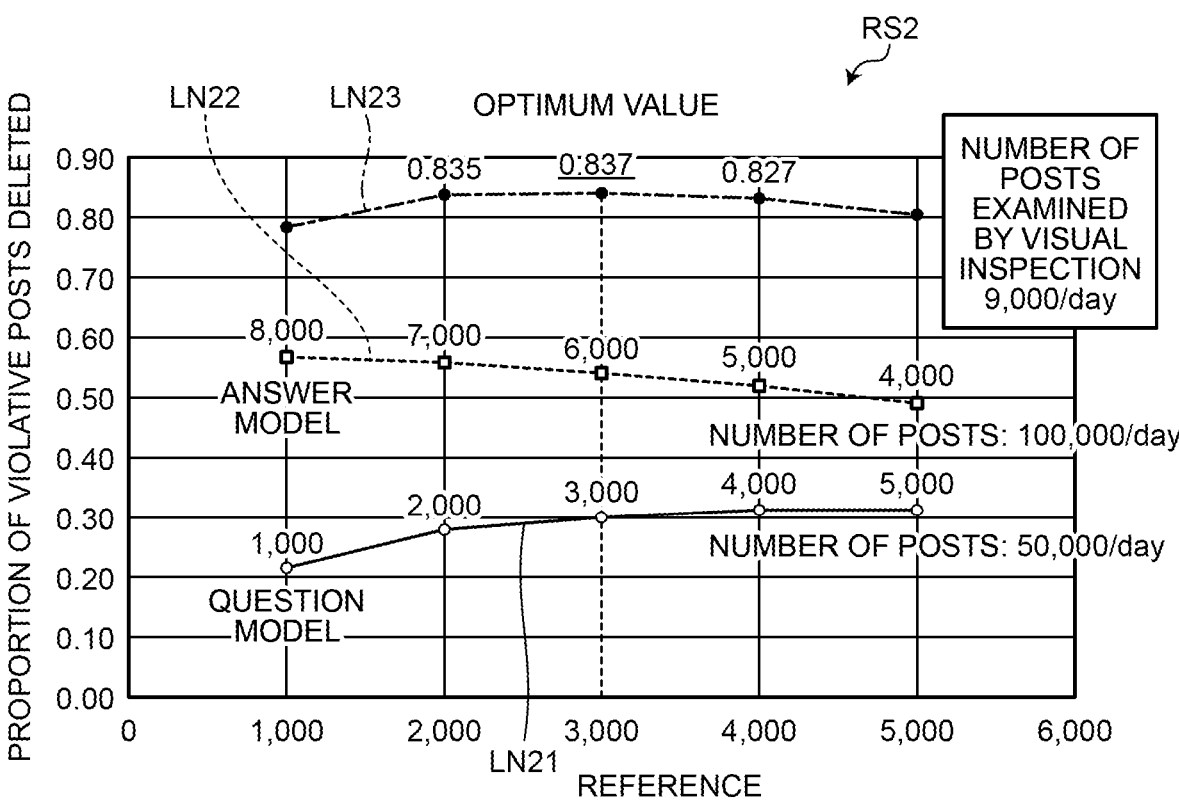
FIG. 7 is a diagram illustrating an example of experimental results.

Examples of experimental results for a case where a model that has been trained by use of an evaluation value calculated by the above described processing will hereinafter be described, with FIG. 6 and FIG. 7 serving as the examples. FIG. 6 and FIG. 7 illustrate the examples of the experimental results. For example, the experimental results illustrated in FIG. 6 and FIG. 7 are examples of experimental results for a case where models that have been trained (generated) by the above described processing related to optimization of models is used. FIG. 6 illustrates an example of experimental results representing relations between new evaluation indices and references as a specific example. Furthermore, FIG. 7 illustrates an example of experimental results representing relations between proportions of violative posts deleted and the numbers checked.

The example of the experimental results related to the relations between the new evaluation indices and the references will be described first by use of FIG. 6. In a graph RS1 of FIG. 6, the horizontal axis represents the value serving as the reference (reference value) and the vertical axis represents the new evaluation index. The references in FIG. 6 indicate the proportions of data to be used in calculation of the new evaluation indices, in the plural output values output by the models. For example, a case where the reference is "0.06" corresponds to a case where data of the top 6% of the plural output values output by the model are used in the calculation of the new evaluation index.

A line LN11 in FIG. 6 represents experimental results for a model (question model) targeted for questions. Furthermore, a line LN12 in FIG. 6 represents experimental results for a model (answer model) targeted for answers. For the question model, in the case where the reference is "0.06", the new evaluation index is "0.893", and in a case where the reference is "0.08", the new evaluation index is "0.929". Furthermore, for the answer model, in a case where the reference is "0.02", the new evaluation index is "0.602".

The graph RS1 in FIG. 6 thus illustrates that 92.9% of all of violative posts are included in the top 8% of the scores for the question model, as illustrated by the line LN11. Therefore, it has been shown that using a model that has been trained on the basis of evaluation values calculated by the above described processing enables adequate extraction of violative posts.

The example of the experimental results related to the relations between the proportions of the violative posts deleted and the numbers checked will be described next by use of FIG. 7. In a graph RS2 of FIG. 7, the horizontal axis represents the number of posts corresponding to questions and the vertical axis represents the proportion of violative posts deleted. FIG. 7 illustrates a case where the number checked is the number of posts examined by visual inspection, "9000", that is the number of posts that are able to be examined through visual inspection by staff in one day, and FIG. 7 illustrates a case where the number of posts that are questions is 50,000 per day and the number of posts that are answers is 100,000 per day.

A line LN21 and a line LN22 in FIG. 7 respectively represent the proportions of violative posts deleted from questions and answers in a case where the number checked "9000" is divided between the questions and answers. A line LN23 in FIG. 7 represents the total of the proportions of violative posts deleted from the questions and answers.

For example, as illustrated by the line LN23, in a case where "2000" is allotted to questions and "7000" is allotted to answers, from the number checked, "9000", the proportion of violative posts deleted is "0.835". Furthermore, according to the graph RS3 in FIG. 7, in a case where "3000" is allotted to questions and "6000" is allotted to answers, from the number checked, "9000", the proportion of violative posts deleted is "0.837". Furthermore, according to the graph RS3 in FIG. 7, in a case where "4000" is allotted to questions and "5000" is allotted to answers, from the number checked, "9000", the proportion of violative posts deleted is "0.827". The graph RS3 in FIG. 7 thus illustrates that the proportion of violative posts deleted was able to be maximized in the case where "3000" was allotted to questions and "6000" was allotted to answers, from the number checked, "9000".

For example, in contrast to a model in the past where the largest proportion of violative posts deleted was "0.531" in the case where the number checked was "9000", a model trained (generated) by the above described processing related to optimization of models enabled the proportion of violative posts deleted to be improved up to "0.837" in the case where the number checked was "9000" and achieved improvement of "+0.306 (+30.6%)" in the precision.

2. Modified Examples

An example of the information processing has been described above. However, the embodiment is not limited to this example. Modified examples of the provision processing will be described hereinafter.

2-1. Configuration of Apparatus

An example where the information processing system 1 has the information processing apparatus 100 that performs evaluation of models and the information providing apparatus 50 that generates models has been described above with respect to the embodiment, but the embodiment is not limited to this example. For example, the information processing apparatus 100 may have any function that the information providing apparatus 50 has. Furthermore, any function demonstrated by the information processing apparatus 100 may be included in the terminal apparatus 10. In that case, the terminal apparatus 10 performs evaluation of a model and automatically performs generation of a model using the information providing apparatus 50.

2-2. Others

Furthermore, of the processing described above with respect to the embodiment, all or part of the processing described as being performed automatically may be performed manually, or all or part of the processing described as being performed manually may be performed automatically by a publicly known method. In addition, the steps of the processing, the specific names, and the information including the various types of data and parameters that have been described above and illustrated in the drawings may be modified in any way unless otherwise particularly stated. For example, the various types of information illustrated in the drawings are not limited to the information illustrated therein.

Furthermore, the elements of each apparatus in the drawings have been illustrated functionally and/or conceptually, and are not necessarily configured physically as illustrated in the drawings. Therefore, specific forms of separation and integration of each apparatus are not limited to those illustrated in the drawings, and all or part of each apparatus may be configured by functional or physical separation or integration in any units according to various loads and use situations.

Furthermore, the above described embodiments may be combined, as appropriate, so long as no contradictions in the processing arise from the combination.

2-3. Program

Figure 8:
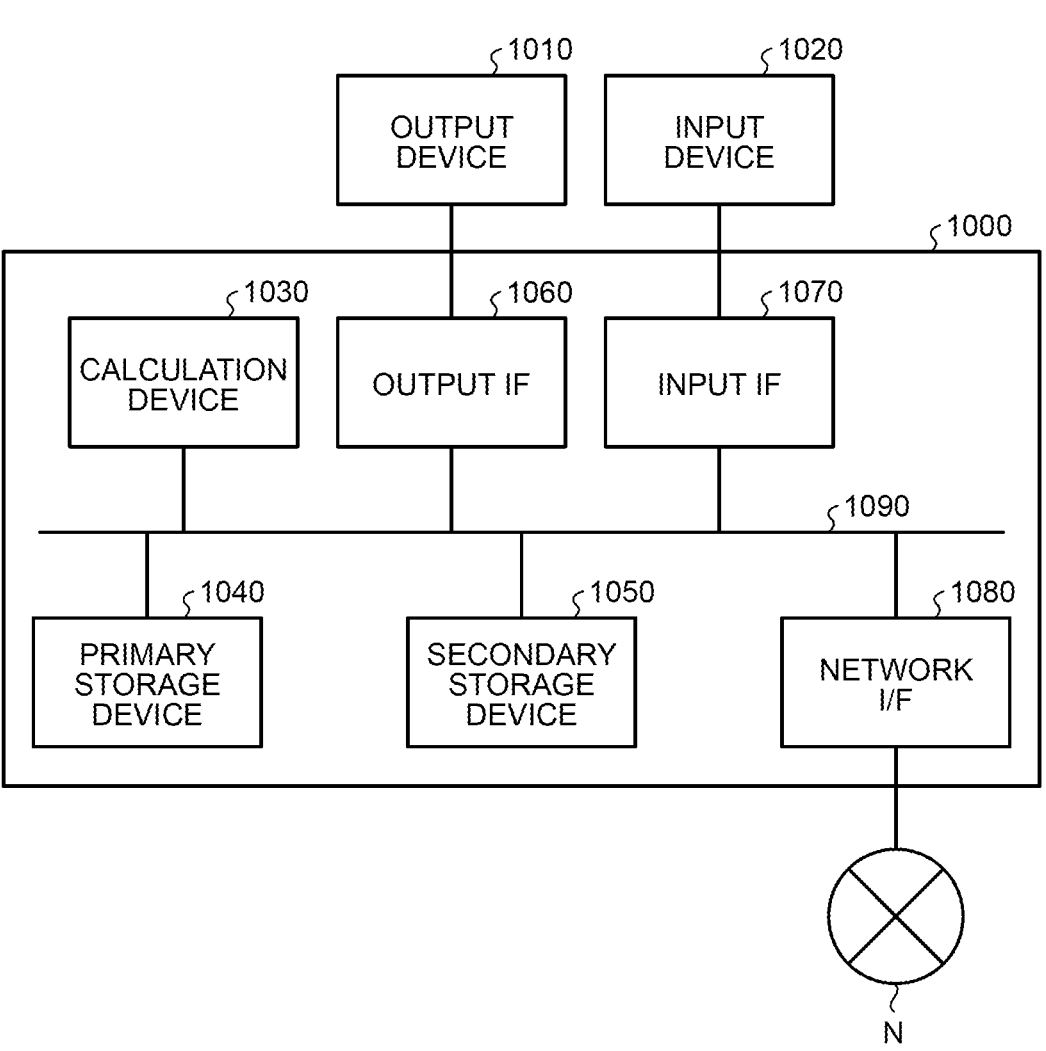
FIG. 8 is a diagram illustrating an example of a hardware configuration.

Furthermore, the information processing apparatus 100 according to the embodiment described above is implemented by a computer 1000 configured as illustrated in FIG. 8, for example. FIG. 8 is a diagram illustrating an example of its hardware configuration. The computer 1000 is connected to an output device 1010 and an input device 1020, and is formed to have a calculation device 1030, a primary storage device 1040, a secondary storage device 1050, an output interface (IF) 1060, an input IF 1070, and a network IF 1080 that are connected to one another via a bus 1090.

The calculation device 1030 operates on the basis of, for example, a program stored in the primary storage device 1040 or secondary storage device 1050 or a program read from the input device 1020, and executes various types of processing. The primary storage device 1040 is a memory device that primarily stores data to be used in various types of calculation by the calculation device 1030, the memory device being, for example, a RAM. Furthermore, the secondary storage device 1050 is a storage device where data to be used in various types of calculation by the calculation device 1030 and various databases are registered, and is implemented by a read only memory (ROM), an HDD, or a flash memory, for example.

The output IF 1060 is an interface for transmitting information to be output, to the output device 1010 that outputs various types of information, the output device 1010 being, for example, a monitor or a printer, and is implemented by, for example, a connector of a standard, such as a universal serial bus (USB), a digital visual interface (DVI), or an HDMI (registered trademark) (High Definition Multimedia Interface). Furthermore, the input IF 1070 is an interface for receiving information from various input devices 1020, such as a mouse, a keyboard, and a scanner.

The input device 1020 may be, for example, a device that reads information from: an optical recording medium, such as a compact disc (CD), a digital versatile disc (DVD), or a phase change rewritable disk (PD); a magneto-optical recording medium, such as a magneto-optical disk (MO); a tape medium; a magnetic recording medium; or a semiconductor memory. Furthermore, the input device 1020 may be an external storage medium, such as a USB memory.

The network IF 1080 receives data from another device via the network N, transmits the received data to the calculation device 1030, and transmits data generated by the calculation device 1030 to another device via the network N.

The calculation device 1030 controls the output device 1010 and the input device 1020 via the output IF 1060 and the input IF 1070. For example, the calculation device 1030 loads a program from the input device 1020 or the secondary storage device 1050 into the primary storage device 1040 and executes the program loaded.

For example, in a case where the computer 1000 functions as the information processing apparatus 100, the calculation device 1030 of the computer 1000 executes the program loaded into the primary storage device 1040 and thereby implements functions of the control unit 130.

3. Effects

As described above, the information processing apparatus 100 has: an obtaining unit (the obtaining unit 131 in the embodiment) that inputs each of plural sets of input data to be subjected to inference processing to a model and obtains output plural output values output by the model and representing inference results corresponding respectively to the plural sets of input data and reference information indicating a reference for evaluation of the model; and a processing unit (the processing unit 133 in the embodiment) that selects an evaluated data group to be used in the evaluation of the model from the plural output values by using a threshold determined on the basis of the reference indicated by the reference information obtained by the obtaining unit and calculates an index value representing an evaluation value of the model by using the evaluated data group selected. The information processing apparatus 100 is thereby able to evaluate the model according to the reference for the evaluation and thus enables flexible evaluation of the model.

Furthermore, the obtaining unit inputs each of plural sets of input data that are pieces of textual information to be subjected to determination of whether or not the pieces of textual information are violative, to a model, and obtains plural output values output by the model and representing determination results respectively corresponding to the plural sets of input data. The information processing apparatus 100 is thereby able to appropriately evaluate the model that determines whether or not the pieces of textual information are violative and thus enables flexible evaluation of the model.

Furthermore, the obtaining unit inputs each of plural sets of input data that are pieces of post information on the Internet to a model, and obtains plural output values output by the model and representing determination results respectively corresponding to the plural sets of input data. The information processing apparatus 100 is thereby able to appropriately evaluate the model that determines whether or not the pieces of post information on the Internet are violative and thus enables flexible evaluation of the model.

Furthermore, the obtaining unit obtains plural output values output by a model and the higher the possibility of an input piece of textual information being violative, the higher the value output by the model. The information processing apparatus 100 is thereby able to appropriately evaluate the model that outputs a higher value when the possibility of an input piece of textual information being violative is higher, and thus enables flexible evaluation of the model.

Furthermore, the processing unit selects, as an evaluated data group, output values equal to or larger than a threshold, from plural output values, and calculates, as an index value representing an evaluation value of a model, a value indicating a proportion of data that are violative, the data being included in the evaluated data group. The information processing apparatus 100 is thereby able to calculate, as the index value representing the evaluation value of the model, the value indicating the proportion of the data that are violative, the data being included in the evaluated data group, and thus enables flexible evaluation of the model.

Furthermore, the obtaining unit obtains reference information indicating the number of sets of input data that are able to be checked in a case where plural sets of input data are checked by predetermined staff. The information processing apparatus 100 is thereby able to appropriately evaluate a model on the basis of the number of sets of input data that are able to be checked in the case where the plural sets of input data are checked by the predetermined staff, and thus enables flexible evaluation of the model.

Furthermore, the processing unit selects an evaluated data group corresponding to a certain number of output values, from plural output values by using a threshold, and calculates, as an index value representing an evaluation value of a model, a value indicating a proportion of data that are violative, the data being included in the evaluated data group corresponding to the certain number of output values. The information processing apparatus 100 is thereby able to appropriately evaluate the model on the basis of the number of sets of input data that are able to be checked in the case where plural sets of input data are checked by predetermined staff, and thus enables flexible evaluation of the model.

Furthermore, the processing unit sorts plural output values in descending order of value, sets all output values equal to or larger than a threshold, among the plural output values that have been sorted, to a first value larger than the threshold, sets all output values less than the threshold, among the plural output values that have been sorted, to a second value smaller than the threshold, and calculates an index value representing an evaluation value of a model by using the evaluated data group that has been set to the first value. The information processing apparatus 100 is thereby able to calculate the index value representing the evaluation value of the model by using the evaluated data group that has been set to the first value and thus enables flexible evaluation of the model.

Furthermore, the processing unit executes optimization processing for a model by using an index value. The information processing apparatus 100 is thereby able to appropriately evaluate the model by using a threshold that has been dynamically changed, and thus enables flexible evaluation of the model according to a reference that determines the threshold and is able to execute the optimization processing for the model adequately according to the reference.

Furthermore, the processing unit executes optimization processing for a model by using plural index values calculated respectively for plural models. The information processing apparatus 100 is thereby able to appropriately evaluate each of the plural models by using a threshold that has been dynamically changed, and thus enables flexible evaluation of the plural models according to a reference that determines the threshold and is able to execute the optimization processing for the plural models adequately according to the reference.

Furthermore, the processing unit executes optimization processing for a model by selecting a model having the highest index value from plural models. The information processing apparatus 100 is thereby able to execute the optimization processing for the model by selecting the model having the highest index value, is thereby able to maintain the model having the highest evaluation value, and is thus able to execute the optimization processing for the model adequately.

Some of embodiments of the present application have been described above in detail on the basis of the drawings, but these are just examples, and the present invention can be implemented in other forms resulting from various modifications and improvements of the embodiment described in the section, Disclosure of Invention, on the basis of knowledge of persons skilled in the art.

Furthermore, the above described "section, module, or unit" may be read as a "means" or "circuit", for example. For example, an obtaining unit may be read as an obtaining means or an obtaining circuit.

EXPLANATIONS OF LETTERS OR NUMERALS

1 INFORMATION PROCESSING SYSTEM
10 TERMINAL APPARATUS

50 INFORMATION PROVIDING APPARATUS
100 INFORMATION PROCESSING APPARATUS
120 STORAGE UNIT
121 INDEX CALCULATION INFORMATION STOR-
    AGE UNIT
122 MODEL INFORMATION STORAGE UNIT
130 CONTROL UNIT
131 OBTAINING UNIT
132 DETERMINING UNIT
133 PROCESSING UNIT
134 PROVIDING UNIT

The invention claimed is:

1. An information processing method executed by a computer, the information processing method comprising:
   an obtaining process of inputting each of plural sets of input data to be subjected to inference processing for violative content detection to a machine learning model, and obtaining: plural output values output by the machine learning model and representing inference results respectively corresponding to the plural sets of input data; and reference information indicating a reference for evaluation of the machine learning model, wherein each output value has a value label that indicates evaluated result of corresponding input data; and
   a processing process of selecting an evaluated data group to be used in the evaluation of the machine learning model, from the plural output values, by using a threshold determined on the basis of the reference indicated by the reference information obtained by the obtaining process, and calculating an index value representing an evaluation value of the machine learning model by using the evaluated data group selected and corresponding value labels,
   wherein the processing process, the plural output values are sorted in descending order of value, all output values equal to or larger than the threshold, among the plural output values that have been sorted, are set to a first value larger than the threshold, all output values less than the threshold, among the plural output values that have been sorted, are set to a second value smaller than the threshold, and the index value representing the evaluation value of the machine learning model is calculated by using the evaluated data group set to the first value,
   wherein the machine learning model is trained using the calculated index value as a feedback parameter to iteratively update model parameters, wherein the training improves violative content detectability of the machine learning model by dynamically optimizing detection thresholds based on the evaluation results.

2. The information processing method according to claim 1, wherein the obtaining process, each of the plural sets of input data that are pieces of textual information to be subjected to determination of whether or not the pieces of textual information are violative is input to the machine learning model, and the plural output values representing determination results output by the machine learning model and respectively corresponding to the plural sets of input data are obtained.

3. The information processing method according to claim 2, wherein the obtaining process, each of the plural sets of input data that are pieces of post information on the Internet is input to the machine learning model, and the plural output values output by the machine learning model and representing determination results respectively corresponding to the plural sets of input data are obtained.

4. The information processing method according to claim 2, wherein the obtaining process, the plural output values output by the machine learning model are obtained, and the higher the possibility of an input piece of textual information being violative, the higher the value output by the machine learning model.

5. The information processing method according to claim 4, wherein the processing process, output values equal to or larger than the threshold are selected as the evaluated data group from the plural output values, and a value indicating a proportion of data that are violative is calculated as the index value representing the evaluation value of the machine learning model, the data being included in the evaluated data group.

6. The information processing method according to claim 2, wherein the obtaining process, the reference information indicating a number of sets of input data that are able to be checked in a case where the plural sets of input data are checked by predetermined staff is obtained.

7. The information processing method according to claim 6, wherein the processing process, the evaluated data group corresponding to the number is selected from the plural output values by using the threshold and a value indicating a proportion of data that are violative is calculated as the index value representing the evaluation value of the machine learning model, the data being included in the evaluated data group corresponding to the number.

8. The information processing method according to claim 1, wherein the processing process, optimization processing for the machine learning model is executed by using the index value calculated.

9. The information processing method according to claim 8, wherein the processing process, optimization processing for the machine learning model is executed by using plural index values calculated respectively for plural machine learning models.

10. The information processing method according to claim 9, wherein the processing process, optimization processing for the machine learning model is executed by selecting a machine learning model having the highest index value from the plural machine learning models.

11. An information processing apparatus, comprising:
    an obtaining unit that inputs each of plural sets of input data to be subjected to inference processing for violative content detection to a machine learning model, and obtains: plural output values output by the machine learning model and representing inference results respectively corresponding to the plural sets of input data; and reference information indicating a reference for evaluation of the machine learning model, wherein each output value has a value label that indicates evaluated result of corresponding input data; and
    a processing unit that selects an evaluated data group to be used in the evaluation of the machine learning model, from the plural output values, by using a threshold determined on the basis of the reference indicated by the reference information obtained by the obtaining unit, and calculates an index value representing an evaluation value of the machine learning model by using the evaluated data group selected and corresponding value labels,
    wherein plural output values are sorted in descending order of value, all output values equal to or larger than the threshold, among the plural output values that have been sorted, are set to a first value larger than the threshold, all output values less than the threshold, among the plural output values that have been sorted, are set to a second value smaller than the threshold, and the index value representing the evaluation value of the machine learning model is calculated by using the evaluated data group set to the first value, wherein the machine learning model is trained using the calculated index value as a feedback parameter to iteratively update model parameters, wherein the training improves violative content detectability of the machine learning model by dynamically optimizing detection thresholds based on the evaluation results.

12. A non-transitory computer-readable storage medium having stored therein an information processing program that causes a computer to execute:

inputting each of plural sets of input data to be subjected to inference processing for violative content detection to a machine learning model, and obtaining: plural output values output by the machine learning model and representing inference results respectively corresponding to the plural sets of input data; and reference information indicating a reference for evaluation of the machine learning model, wherein each output value has a value label that indicates evaluated result of corresponding input data; and selecting an evaluated data group to be used in the evaluation of the machine learning model, from the plural output values, by using a threshold determined on the basis of the reference indicated by the obtained reference information, and calculating an index value representing an evaluation value of the machine learning model by using the evaluated data group selected and corresponding value labels, wherein the plural output values are sorted in descending order of value, all output values equal to or larger than the threshold, among the plural output values that have been sorted, are set to a first value larger than the threshold, all output values less than the threshold, among the plural output values that have been sorted, are set to a second value smaller than the threshold, and the index value representing the evaluation value of the machine learning model is calculated by using the evaluated data group set to the first value, wherein the machine learning model is trained using the calculated index value as a feedback parameter to iteratively update model parameters, wherein the training improves violative content detectability of the machine learning model by dynamically optimizing detection thresholds based on the evaluation results.

13. An information processing method executed by a computer, the information processing method comprising:

performing, for each of a plurality of machine learning models, model inferencing for violative content detection using a plurality of input data sets to generate a corresponding plurality of inference results;

receiving a plurality of value labels that corresponds to the plurality of input data sets, the plurality of value labels indicating actual evaluated results that correspond to the plurality of input data sets;

performing, for each of a plurality of machine learning models:

grouping ones of the plurality of inference results being equal to or greater than an inference threshold into a data group, and setting the ones of the plurality of inference results being equal to or greater than the inference threshold to a first value that is greater than the inference threshold;

setting ones of the plurality of inference results being less than the inference threshold to a second value that is less than the inference threshold; and calculating an index value representing a machine learning evaluation value by using the data group and associated value labels from the plurality of value labels; and selecting a machine learning model with a highest index value from the plurality of machine learning models for deployment, wherein the selected machine learning model is trained using the associated index value as a feedback parameter to iteratively update model parameters, wherein the training improves violative content detectability of the selected machine learning model by dynamically optimizing detection thresholds based on the evaluation results.

* * * * *